United States Patent
Bringley et al.

(10) Patent No.: US 7,541,017 B2
(45) Date of Patent: Jun. 2, 2009

(54) AMINE POLYMER-MODIFIED NANOPARTICULATE CARRIERS

(75) Inventors: Joseph F. Bringley, Rochester, NY (US); Tiecheng A. Qiao, Webster, NY (US); John W. Harder, Rochester, NY (US); Andrew Wunder, Lyons, NY (US); James M. Hewitt, Fairport, NY (US)

(73) Assignee: Carestream Health, Inc., Rochester, NY (US)

( * ) Notice: Subject to any disclaimer, the term of this patent is extended or adjusted under 35 U.S.C. 154(b) by 581 days.

(21) Appl. No.: 11/036,814

(22) Filed: Jan. 14, 2005

(65) Prior Publication Data
US 2005/0192381 A1 Sep. 1, 2005

Related U.S. Application Data

(63) Continuation-in-part of application No. 10/622,354, filed on Jul. 18, 2003, now abandoned.

(51) Int. Cl.
*A61K 51/00* (2006.01)
*B01J 13/00* (2006.01)
*C09D 11/00* (2006.01)

(52) U.S. Cl. .................. 424/1.29; 516/78; 428/407; 427/221

(58) Field of Classification Search ............. 516/78; 424/1.29; 428/407; 427/221
See application file for complete search history.

(56) References Cited

U.S. PATENT DOCUMENTS

| 3,796,634 | A | * | 3/1974 | Haynes et al. | ............... 435/180 |
| 4,904,411 | A | * | 2/1990 | Novich et al. | ................. 516/33 |
| 6,207,134 | B1 | | 3/2001 | Fahlvik et al. | |
| 2003/0124194 | A1 | | 7/2003 | Gaw et al. | |
| 2005/0118409 | A1 | * | 6/2005 | McNeff et al. | ........... 428/312.2 |
| 2005/0192381 | A1 | | 9/2005 | Bringley et al. | |

FOREIGN PATENT DOCUMENTS

| EP | 1 013 605 | 6/2000 |
| WO | 02/087750 | 11/2002 |

OTHER PUBLICATIONS

Susan E. Burke and Christopher J. Barrett; "Acid-Base Equilibria of Weak Polyelectrolytes in Multilayer Thin Films"; Jan. 17, 2003; Langmuir, 19, 3297.
Greg T. Hermanson; "Bioconjugate Techniques"; 1996, Title and BIB pages only.

\* cited by examiner

*Primary Examiner*—Daniel S Metzmaier

(57) ABSTRACT

The invention relates to a composition comprising a colloid which is stable under physiological pH and ionic strength, said colloid comprising particles having a silica core and a shell: a) wherein said shell comprises a cross-linked poly (ethylene)imine polymer having amine functionalities; b) wherein the particles have a volume-weighted mean particle size diameter of less than 200 nm, and c) wherein greater than 50% of said polymer in the colloid is bound to the core surfaces, wherein the polymer having amine functionalities has an average molecular weight less than 100,000 g/mol, the composition has a H of between 6 and 8; and d) wherein the colloid contains between 300 and 6000 .μmol amine-monomer/g core particles.

16 Claims, No Drawings

AMINE POLYMER-MODIFIED NANOPARTICULATE CARRIERS

CROSS REFERENCE TO RELATED APPLICATIONS

The carriers described in this application can be made by a process that is described in commonly assigned application entitled: COLLOIDAL CORE-SHELL ASSEMBLIES AND METHODS OF PREPARATION, in the names of Joseph F. Bringley et al., filed on even date herewith; which is a continuation-in-part application of U.S. Ser. No. 10/622,354 filed Jul. 18, 2003, now abandoned also entitled COLLOIDAL CORE-SHELL ASSEMBLIES AND METHODS OF PREPARATION by Joseph F. Bringley.

FIELD OF THE INVENTION

The invention relates to colloids containing polymer-modified core-shell particle carrier. More particularly, there are described colloids containing core-shell nanoparticulate carrier particles wherein the shell contains a polymer having amine functionalities. The described carrier particles are stable under physiological conditions.

BACKGROUND OF THE INVENTION

The ordered assembly of nanoscale and molecular components has promise to create molecular-assemblies capable of mimicking biological function, and capable of interacting with living cells and cellular components. Many techniques for creating nanoscale assemblies are being developed and include small-molecule assembly, polyelectrolyte assembly, nanoscale precipitation, core-shell assemblies, heterogeneous precipitation, and many others. However, a significant challenge lies in creating methods for assembling or fashioning nanoparticles, or molecules, into materials capable of being fabricated into free-standing, stable, working "devices". While much progress has been made regarding two-dimensional (or layered) molecular assemblies, discrete three-dimensional assemblies of nanoparticles or molecules are generally much more difficult to fabricate and far fewer examples and methodologies have been reported. Three-dimensional nanoscale assemblies often suffer from instabilities, and resist integration into working systems. A simple example involves integration of nanoscale assemblies into living organisms. Successful integration requires assemblies which are colloidally stable under highly specific conditions (physiological pH and ionic strength), are compatible with blood components, are capable of avoiding detection by the immune system, and may survive the multiple filtration and waste removal systems inherent to living organisms. Highly precise methods of assembly are necessary for building ordered nanoscale assemblies capable of performing under stringent conditions.

More recently, there has been intense interest focused upon developing surface-modified nanoparticulate materials that are capable of carrying biological, pharmaceutical or diagnostic components. The components, which might include drugs, therapeutics, diagnostics, and targeting moieties can then be delivered directly to diseased tissue or bones and be released in close proximity to the disease and reduce the risk of side effects to the patient. This approach has promised to significantly improve the treatment of cancers and other life threatening diseases and may revolutionize their clinical diagnosis and treatment. The components that may be carried by the nanoparticles can be attached to the nanoparticle by well-known bio-conjugation techniques; discussed at length in Bioconjugate Techniques, G. T. Hermanson, Academic Press, San Diego, Calif. (1996). The most common bio-conjugation technique involves conjugation, or linking, to an amine functionality.

Many authors have described the difficulty of making colloidally stable dispersions of colloids having surface modified particles. Achieving colloidal stability under physiological conditions (pH 7.4 and 137 mM NaCl) is yet even more difficult. Burke and Barret (Langmuir, 19, 3297(2003)) describe the adsorption of the amine-containing polyelectrolyte, polyallylamine hydrochloride, onto 70-100 nm silica particles in the presence of salt. The authors state (p.3299) "the concentration of NaCl in the colloidal solutions was maintained at 1.0 mM because higher salt concentrations lead to flocculation of the colloidal suspension".

Siiman et al. U.S. Pat. No. 5,248,772 describes the preparation of colloidal metal particles having a cross-linked aminodextran coating with pendant amine groups attached thereto. The colloid is prepared at a very low concentration of solids 0.24% by weight, there is no indication of the final particle size, and there is no indication of the fraction of aminodextran directly bound to the surface of the colloid. Since the ratio of the weight of shell material (0.463 g) to the weight of core material (0.021 g) in example 2 is roughly 21:1, it appears likely that only a very small fraction of the aminodextran is bound to the surface of the colloid and that most remains free in solution. There is a problem in that this leads to a very small amount of active amine groups on the surface of the particle, and hence a very low useful biological, pharmaceutical or diagnostic components capacity for the described carrier particles in the colloids. There is an additional problem in that polymer not adsorbed to the particle surfaces may intefer with subsequent attachment or conjugation, of biological, pharmaceutical or diagnostic components.

U.S. Pat. No. 6,207,134 B1 describes particulate diagnostic contrast agents comprising magnetic or supermagnetic metal oxides and a polyionic coating agent. The coating agent can include "physiologically tolerable polymers" including amine-containing polymers. The contrast agents are said to have "improved stability and toxicity compared to the conventional particles" (col. 6, line 11-13). The authors state (Col. 4, line 15-16) that "not all the coating agent is deposited, it may be necessary to use 1.5-7, generally about two-fold excess . . . " of the coating agent. The authors further show that only a small fraction of polymer adsorbs to the particles. For example, from FIG. 1 of '134, at 0.5 mg/mL polymer added only about 0.15 mg/mL adsorbs, or about 30%. The surface-modified particles of '134 are made by a conventional method involving simple mixing, sonication, centrifugation and filtration.

It would be desirable to produce nanoparticle carriers for bioconjugation and targeted delivery which are stable colloids so that they can be injected in vivo, especially intravascularly. Further, it is desirable that the nanoparticle carriers be stable under physiological conditions (pH 7.4 and 137 mM NaCl). Still further, it is desirable that the particles avoid detection by the immune system. It is desirable to minimize the number of amine groups not adsorbed to the nanoparticle and limit "free" amine-functionalties in solution, since the free amines may interfere with the function of the nanoparticle assembly.

PROBLEM TO BE SOLVED BY THE INVENTION

There remains a need for colloids comprising core-shell carrier particles that are stable over useful periods of time, that are stable in physiological conditions, and that may be pH adjusted to effect the bioconjugation of biological, pharmaceutical or diagnostic components. There remains a need for colloids comprising core-shell carrier particles that limit, or minimize, the number of "free" amine functionalities in solution while maintaining colloid stability under physiological conditions, and that preferably use only one, or a few, molecular layers of polymer having amine functionalities in the shell. There remains a need for methods for manufacturing colloids comprising core-shell carrier particles that provide stable colloids having high concentrations (5-50% solids). There is a further need for such colloids that can be made at high production rates and low cost. There is a further need for improved methods of obtaining well-ordered, homogeneous colloids comprising core-shell carrier particles in which substantially all of the carrier particles in the colloid are surface-modified with an amine containing polymer shell, and the colloid is substantially free of unmodified colloid particles, and is substantially free of amine functionalities that are unattached to the colloids. Colloids in which the pH can be freely adjusted between about pH 5 to pH 9 without desorption of the amine functionalities in the shell are also desired.

DETAILED DESCRIPTION OF THE INVENTION

The invention provides a composition comprising a colloid that is stable under physiological pH and ionic strength, said colloid comprising particles having a core and a shell:
 a) wherein said shell comprises a polymer having amine functionalities;
 b) wherein the particles have a volume-weighted mean particle size diameter of less than 200 nm, and
 c) wherein greater than 50% of said polymer in the colloid is bound to the core surfaces.

The described composition is a stable colloid (sometimes also referred to as a suspension or dispersion). A colloid consists of a mixture of small solid particulates in a liquid, such as water. The colloid is said to be stable if the solid particulates do not aggregate (as determined by particle size measurement) and settle from the colloid, usually for a period of hours, preferably weeks to months. Terms describing colloidal instability include aggregation, agglomeration, flocculation, gelation and settling. Significant growth of mean particle size to diameters greater than about three times the core diameter, and visible settling of the colloid within one day of its preparation is indicative of an unstable colloid.

It is often the surface properties of the particles in the colloid, such as their electrostatic charge, which contributes to the stability of the colloid. Typically the surfaces are significantly charged, positive or negative, so as to provide electrostatic repulsion to overcome forces which would otherwise lead to the aggregation and settling of the particles from the colloid. It has been of interest to surface modify particles, or to "assemble" colloidal particles of opposite charge to achieve specific properties. However, this is often difficult since the surface modification or assembly disrupts the electrostatic and steric forces necessary for colloidal stability; and stable colloids are not easily obtained. The present composition is a stable colloid and hence should remain in suspension for a period of greater than a few hours, and more preferably greater than a few days; and most preferably greater than a few weeks. The zeta potential of the colloid can have a maximum value greater than about±20 mV, and more preferably greater than about±30 mV. A high zeta potential is preferred because it increases the colloidal stability of the colloid. The pH of the dispersion may be adjusted as is necessary to obtain a stable colloid during the process steps necessary to produce the final composition. The pH of the colloid can be between about pH 4 and pH 10 and more preferably between about pH 5 and pH 9 during these process steps. In final form, the colloid is stable under physiological conditions (e.g. pH 7.4, 137 mM NaCl), or in buffers or saline solutions typically used in in-vivo applications, especially in compositions used for intravascular injections. Thus, the colloid can remain stable when introduced into, or diluted by, such solutions. Physiological pH and ionic strength may vary from about pH 6 to about pH 8, and salt concentrations of about 30 mM to about 600 mM and the described compositions are stable under any combination within these ranges.

The described composition comprises a colloid including core-shell particles that can serve as carrier particles. These core-shell particles have a mean particle size diameter of less than 200 nm. (For convenience, these particles will be referred to as "nanoparticles" or "nanoparticulates" or similar terms.) The "carrier particles" are those particles including the core and the polymer shell. This core-shell sub assembly can be the starting point for other assembled particles including additional components such as biological, pharmaceutical or diagnostic components as well as components to improve biocompatibility and targeting, for example. These additional components can make the resulting particles larger.

The particle size(s) of the core-shell particles in the colloid may be characterized by a number of methods, or combination of methods, including coulter methods, light-scattering methods, sedimentation methods, optical microscopy and electron microscopy. The particles in the examples were characterized using light-scattering methods. Light-scattering methods may sample $10^9$ or more particles and are capable of giving excellent colloidal particle statistics. Light-scattering methods may be used to give the percentage of particles existing within a given interval of diameter or size, for example, 90% of the particles are below a given value. Light-scattering methods can be used to obtain information regarding mean particle size diameter, the mean number distribution of particles, the mean volume distribution of particles, standard deviation of the distribution(s) and the distribution width for nanoparticulate particles. In the present core-shell particles, which can be used as carrier particles, it is preferred that at least 90% of the particles be less than 4-times the mean particle size diameter, and more preferably that at least 90% of the particles are less than 3-times the mean particle size diameter. The mean particle size diameter may be determined as the number weighted (mean size of the total number of particles) or as the area, volume or mass weighted mean. It is preferred that the volume or mass weighted mean particle size diameter be determined, since larger particles having a much greater mass are more prominently counted using this technique. In addition, a narrow size-frequency distribution for the particles may be obtained. A measure of the volume-weighted size-frequency distribution is given by the standard deviation (sigma) of the measured particle sizes. It is preferred that the standard deviation of the volume-weighted mean particle size diameter distribution is less than the mean particle size diameter, and more preferably less than one-half of the mean particle size diameter. This describes a particle size distribution that is desirable for injectable compositions.

The core particle can have a negative surface charge. The surface charge of a colloid may be calculated from the electrophoretic mobility and is described by the zeta potential. Colloids with a negative surface charge have a negative zeta potential; whereas colloids with a positive surface charge have a positive zeta potential. It is preferred that the absolute value of the zeta potential of the core-particle be greater than 10 mV and more preferably greater than 20 mV. It is further preferred that the core particle have a negative zeta potential. Measurement of the electrophoretic mobility and zeta potential is described in "The Chemistry of Silica", R. K. Iler, John Wiley and Sons (1979).

Core particle materials may be selected from inorganic materials such as metal oxides, metal oxyhydroxides and insoluble salts; and from organic particulates such as latexes, polystyrene, and insoluble polymers. Preferred core particle materials are inorganic colloidal particles, such as alumina, silica, boehmite, zinc oxide, calcium carbonate, titanium dioxide, and zirconia. Preferred organic core particle materials are selected from aqueous latexes and polystyrene. The surfaces of the organic core particles may be negatively charged through the introduction of functional groups such as carboxylates, sulfonates or phosphates, and through the control of pH conditions. In a particularly preferred embodiment the core particles are silica particles. In a particularly preferred embodiment the core particles are silica particles having a diameter between about 4 and 50 nm.

The described composition comprises a shell polymer having amine functionalities. The amine functionalities serve at least two purposes. First, they provide attachment sites for "linking" the polymer to the core surface. Linking can occur through electrostatic attraction of a polyamine to negatively charged surfaces, since the amine may be positively charged through protonation of the amine functionalities. Linking can also occur by hydrogen bonding of the polyamine to the particle surfaces. It is preferred that the polymer is permanently attached to the surface and does not de-adsorb when the pH is changed or the ionic strength (salt concentration) is changed. It is further preferred that the polymer having amine functionalities is cross-linked. Cross-linking helps to prevent de-adsorption of the polymer having amine functionalities from the particle surfaces. The amount of cross-linking reagent should be minimized, and it is preferred that only enough necessary to prevent de-adsorption be used. The molar ratio of cross-linking reagents to polymers should be between about 1:1 and about 25:1. Cross-linking reagents that can be used are described in M. Brinkley, Bioconjugate Chem. 3, 2 (1992) and in "Chemistry of Protein Conjugation and Cross-linking, S. S. Wong, CRC Press (1991).

It is desirable that the ratio of polymer having amine functionalities (polyamine) to core particles is such that there is an amount of polyamine at least equal to the amount required to cover the surfaces of the core particles. When there is insufficient coverage, stable core-shell colloids are not obtained. It is furthermore desired that the polyamine should not be supplied in a very large excess of that required to substantially cover all the surfaces of said core particles. In this case, excess polyamine may not be strongly bound by the core particles but may remain in solution. Unbound polyamine is undesired since it may have properties distinct from the core-shell particles; and purification and separation of the free polyamine from the core-shell colloid may be difficult. Generally, an amount at least equal to the amount of polyamine required to cover the surfaces of the core particles is provided by a concentration of polyamine greater than about 4 μmol amine-monomer/m² core surface area. This quantity can easily be calculated by those experienced in the art and is given by the expression: [(g polyamine×10⁶)/((M$_w$ polymer×(M$_w$ monomer/M$_w$ polymer)]/[g core-particles×specific surface area]>4; where M$_w$ is the molecular weight, g is weight in grams and the specific surface area of the core particles in g/m². The core-shell colloid can contain between 10 and 30 μmol amine-monomer/m² core surface area. It is further desirable that the core-shell colloid contains between 300 and 6000 μmol amine-monomer/g core particles. This is desired because it can provide a core-shell colloid having a useful biological, pharmaceutical or diagnostic components capacity for the described carrier particle applications, and because it provides core-shell colloids whose pH can be adjusted over a broad range while maintaining colloidal stability.

Greater than 50% of the polymer having amine functionalities that is present in solution can be directly adsorbed to the core particle surfaces, more preferably greater than 70% and most preferably greater than 90%. This percentage is the weight percentage of the amount of polymer bound directly to the core particles, divided by the total amount of polymer in the colloid. It is desired to minimize the number of amine groups not adsorbed to the nanoparticle and limit "free" amine-functionalties in solution, since the free amines might interfere with the function of the nanoparticle assembly, particularly during subsequent conjugation steps. The amount of surface adsorbed to the core particle surfaces can be measured by Solution State NMR as described in the experimental section.

The shell polymers may comprise any polymer that contains amine functionalities, including polyamines, co-polymers of polyamines, polymers dervatized with amino functionalities, and bio-polymers that contain amine-functionalities. Useful shell polymers include (but are not limited to) polyethylenimine, polyallylamine, polyvinylamine, polyvinylpyridine, amine derivatived polyvinylalcohol, and biopolymers such as polylysine, amino-dextran, chitosan, gelatins, gum arabic, pectins, proteins, polysaccharides, polypeptides, and copolymers thereof. Preferred polymers include polyethylenimine, polyallylamine, polylysine and amine containing biopolymers. The amine groups are preferably, primary amines (—NH2), or secondary amines (—NHR), where R is an organic group.

If the nanoparticle core-shell particle comprises a cytotoxic component such as metal, metal oxide, or an organic compound, it is desirable to assure biocompatibility between the nanoparticle and a subject to which the nanoparticle may be administered. Some components are relatively inert and less physiologically intrusive than others. Coating or otherwise wholly or partly covering the core-shell nanoparticle carrier with a biocompatible substance can minimize the detrimental effects of any metal organic or polymeric materials.

Biocompatible means that a composition does not disrupt the normal function of the bio-system into which it is introduced. Typically, a biocompatible composition will be compatible with blood and does not otherwise cause an adverse reaction in the body. For example, to be biocompatible, the material should not be toxic, immunogenic or thrombogenic. Biodegradable means that the material can be degraded either enzymatically or hydrolytically under physiological conditions to smaller molecules that can be eliminated from the body through normal processes.

To render biocompatibility of the described core-shell nanoparticle colloid so that it has a suitably long in-vivo persistence (half-life), a protective chain can be added to the surface of the nanoparticle in some embodiments by association with at least some of the amine functionalities. The protective chain can either be a part of the shell or attached to the described to form a second shell. Examples of useful protective chains include polyethylene glycol (PEG), methoxypolyethylene glycol (MPEG), methoxypolypropylene glycol, polyethylene glycol-diacid, polyethylene glycol monoamine, MPEG monoamine, MPEG hydrazide, and MPEG imidazole. The protective chain can also be a block-copolymer of PEG and a different polymer such as a polypeptide, polysaccharide, polyamidoamine, polyethyleneamine, polynucleotide, proteins (such as BSA), lipids (including membrane envelopes) and carbohydrates. Synthetic, biocompatible polymers are discussed generally in Holland et al., 1992, "Biodegradable Polymers," Advances in Pharmaceutical Sciences 6:101-164.

Addition of these biocompatibility compounds can be performed following the addition of the other biological, pharmaceutical or diagnostic components and can serve as the final synthetic step before introduction of the assembly to a subject or system.

These materials can also be protective or masking agents for the nanoparticle carrier and the biological, pharmaceutical or diagnostic components attached thereto to prevent recognition by the immune system or other biological systems (e.g. proteases, nucleases (e.g. DNAse or RNAse), or other enzymes or biological entities associated with undesired degradation). Thus, the protective addition to the polymer shell provides cloaking or stealth features to facilitate that the assembly reaches a desired cell or tissue with the biological, pharmaceutical or diagnostic component intact.

The present core-shell nanoparticle compositions can be useful as a carrier for carrying a biological, pharmaceutical or diagnostic component. Specifically, the nanoparticulate carrier particles do not necessarily encapsulate a specific therapeutic or an imaging component, but rather serve as a carrier for the biological, pharmaceutical or diagnostic components. Biological, pharmaceutical or diagnostic components such as therapeutic agents, diagnostic agents, dyes or radiographic contrast agents, can be associated with the shell or core. The term "diagnostic agent" includes components that can act as contrast agents and thereby produce a detectable indicating signal in the host mammal. The detectable indicating signal may be gamma-emitting, radioactive, echogenic, fluoroscopic or physiological signals, or the like. The term biomedical agent as used herein includes biologically active substances which are effective in the treatment of a physiological disorder, pharmaceuticals, enzymes, hormones, steroids, recombinant products and the like. Exemplary therapeutic agents are antibiotics, thrombolytic enzymes such as urokinase or streptokinase, insulin, growth hormone, chemotherapeutics such as adriamycin and antiviral agents such as interferon and acyclovir. These therapeutic agents can be associated with the shell or core of the nanoparticle which upon enzymatic degradation, such as by a protease or a hydrolase, the therapeutic agents can be released over a period of time.

The described composition can further comprise a biological, pharmaceutical or diagnostic component that includes a targeting moiety that recognizes the specific target cell. Recognition and binding of a cell surface receptor through a targeting moiety associated with a described nanoparticulate core-shell carrier can be a feature of the described compositions. This feature takes advantage of the understanding that a cell surface binding event is often the initiating step in a cellular cascade leading to a range of events, notably receptor-mediated endocytosis. The term "receptor mediated endocytosis" ("RME") generally describes a mechanism by which, catalyzed by the binding of a ligand to a receptor disposed on the surface of a cell, a receptor-bound ligand is internalized within a cell. Many proteins and other structures enter cells via receptor mediated endocytosis, including insulin, epidermal growth factor, growth hormone, thyroid stimulating hormone, nerve growth factor, calcitonin, glucagon and many others.

Receptor Mediated Endocytosis (hereinafter "RME") affords a convenient mechanism for transporting a described nanoparticle, possibly containing other biological, pharmaceutical or diagnostic components, to the interior of a cell.

In RME, the binding of a ligand by a receptor disposed on the surface of a cell can initiate an intracellular signal, which can include an endocytosis response. Thus, a nanoparticulate core-shell carrier with a targeting moiety associated, can bind on the surface of a cell and subsequently be invaginated and internalized within the cell. A representative, but non-limiting, list of moieties that can be employed as targeting agents useful with the present compositions is selected from the group consisting of proteins, peptides, aptomers, small organic molecules, toxins, diptheria toxin, pseudomonas toxin, cholera toxin, ricin, concanavalin A, Rous sarcoma virus, Semliki forest virus, vesicular stomatitis virus, adenovirus, transferrin, low density lipoprotein, transcobalamin, yolk proteins, epidermal growth factor, growth hormone, thyroid stimulating hormone, nerve growth factor, calcitonin, glucagon, prolactin, luteinizing hormone, thyroid hormone, platelet derived growth factor, interferon, catecholamines, peptidomimetrics, glycolipids, glycoproteins and polysaccharides. Homologs or fragments of the presented moieties can also be employed. These targeting moieties can be associated with a nanoparticulate core-shell and be used to direct the nanoparticle to a target cell, where it can subsequently be internalized. There is no requirement that the entire moiety be used as a targeting moiety. Smaller fragments of these moieties known to interact with a specific receptor or other structure can also be used as a targeting moiety.

An antibody or an antibody fragment represents a class of most universally used targeting moiety that can be utilized to enhance the uptake of nanoparticles into a cell. Antibodies may be prepared by any of a variety of techniques known to those of ordinary skill in the art. See, e.g., Harlow and Lane, Antibodies: A Laboratory Manual, Cold Spring Harbor Laboratory, 1988. Antibodies can be produced by cell culture techniques, including the generation of monoclonal antibodies or via transfection of antibody genes into suitable bacterial or mammalian cell hosts, in order to allow for the production of recombinant antibodies. In one technique, an immunogen comprising the polypeptide is initially injected into any of a wide variety of mammals (e.g., mice, rats, rabbits, sheep or goats). A superior immune response may be elicited if the polypeptide is joined to a carrier protein, such as bovine serum albumin or keyhole limpet hemocyanin. The immunogen is injected into the animal host, preferably according to a predetermined schedule incorporating one or more booster immunizations, and the animals are bled periodically. Polyclonal antibodies specific for the polypeptide may then be purified from such antisera by, for example, affinity chromatography using the polypeptide coupled to a suitable solid support.

Monoclonal antibodies specific for an antigenic polypeptide of interest may be prepared, for example, using the technique of Kohler and Milstein, Eur. J. Immunol. 6:511-519, 1976, and improvements thereto.

Monoclonal antibodies may be isolated from the supernatants of growing hybridoma colonies. In addition, various techniques may be employed to enhance the yield, such as injection of the hybridoma cell line into the peritoneal cavity of a suitable vertebrate host, such as a mouse. Monoclonal antibodies may then be harvested from the ascites fluid or the blood. Contaminants may be removed from the antibodies by conventional techniques, such as chromatography, gel filtration, precipitation, and extraction. The polypeptides of this invention may be used in the purification process in, for example, an affinity chromatography step.

A number of "humanized" antibody molecules comprising an antigen-binding site derived from a non-human immunoglobulin have been described (Winter et al. (1991) Nature 349:293-299; Lobuglio et al. (1989) Proc. Nat. Acad. Sci. USA 86:4220-4224. These "humanized" molecules are designed to minimize unwanted immunological response toward rodent antihuman antibody molecules that limits the duration and effectiveness of therapeutic applications of those moieties in human recipients.

Vitamins and other essential minerals and nutrients can be utilized as targeting moiety to enhance the uptake of nanoparticle by a cell. In particular, a vitamin ligand can be selected from the group consisting of folate, folate receptor-binding analogs of folate, and other folate receptor-binding ligands, biotin, biotin receptor-binding analogs of biotin and other biotin receptor-binding ligands, riboflavin, riboflavin receptor-binding analogs of riboflavin and other riboflavin receptor-binding ligands, and thiamin, thiamin receptor-binding analogs of thiamin and other thiamin receptor-binding ligands. Additional nutrients believed to trigger receptor mediated endocytosis, and thus also having application in accordance with the presently disclosed method, are carnitine, inositol, lipoic acid, niacin, pantothenic acid, pyridoxal, and ascorbic acid, and the lipid soluble vitamins A, D, E and K. Furthermore, any of the "immunoliposomes" (liposomes having an antibody linked to the surface of the liposome) described in the prior art are suitable for use with the described compositions.

Since not all natural cell membranes possess biologically active biotin or folate receptors, use of the described compositions in-vitro on a particular cell line can involve altering or otherwise modifying that cell line first to ensure the presence of biologically active biotin or folate receptors. Thus, the number of biotin or folate receptors on a cell membrane can be increased by growing a cell line on biotin or folate deficient substrates to promote biotin and folate receptor production, or by expression of an inserted foreign gene for the protein or apoprotein corresponding to the biotin or folate receptor.

RME is not the exclusive method by which the described core-shell nanoparticles can be translocated into a cell. Other methods of uptake that can be exploited by attaching the appropriate entity to a nanoparticle include the advantageous use of membrane pores. Phagocytotic and pinocytotic mechanisms also offer advantageous mechanisms by which a nanoparticle can be internalized inside a cell.

The recognition moiety can further comprise a sequence that is subject to enzymatic or electrochemical cleavage. The recognition moiety can thus comprise a sequence that is susceptible to cleavage by enzymes present at various locations inside a cell, such as proteases or restriction endonucleases (e.g. DNAse or RNAse).

A cell surface recognition sequence is not a requirement. Thus, although a cell surface receptor targeting moiety can be useful for targeting a given cell type, or for inducing the association of a described nanoparticle with a cell surface, there is no requirement that a cell surface receptor targeting moiety be present on the surface of a nanoparticle.

To assemble the biological, pharmaceutical or diagnostic components to a described core-shell nanoparticulate carrier, the components can be associated with the nanoparticle carrier through a linkage. By "associated with", it is meant that the component is carried by the nanoparticle, for example the shell of core-shell nanoparticle. The component can be dissolved and incorporated in the particle non-covalently. A preferred method of associating the component is by covalent bonding through the amine function of the shell.

Generally, any manner of forming a linkage between a biological, pharmaceutical or diagnostic component of interest and a core-shell nanoparticulate carrier can be utilized. This can include covalent, ionic, or hydrogen bonding of the ligand to the exogenous molecule, either directly or indirectly via a linking group. The linkage is typically formed by covalent bonding of the biological, pharmaceutical or diagnostic component to the core-shell nanoparticle carrier through the formation of amide, ester or imino bonds between acid, aldehyde, hydroxy, amino, or hydrazo groups on the respective components of the complex. Art-recognized biologically labile covalent linkages such as imino bonds and so-called "active" esters having the linkage —COOCH, —O—O— or —COOCH are preferred. Hydrogen bonding, e.g., that occurring between complementary strands of nucleic acids, can also be used for linkage formation.

After a sufficiently pure colloid (preferably comprising a core-shell nanoparticulate carrier with a biological, pharmaceutical or diagnostic component) has been prepared, it might be desirable to prepare the nanoparticle in a pharmaceutical composition that can be administered to a subject or sample. Preferred administration techniques include parenteral administration, intravenous administration and infusion directly into any desired target tissue, including but not limited to a solid tumor or other neoplastic tissue. Purification can be achieved by employing a final purification step, which disposes the nanoparticle composition in a medium comprising a suitable pharmaceutical composition. Suitable pharmaceutical compositions generally comprise an amount of the desired nanoparticle with active agent in accordance with the dosage information (which is determined on a case-by-case basis). The described particles are admixed with an acceptable pharmaceutical diluent or excipient, such as a sterile aqueous solution, to give an appropriate final concentration. Such formulations can typically include buffers such as phosphate buffered saline (PBS), or additional additives such as pharmaceutical excipients, stabilizing agents such as BSA or HSA, or salts such as sodium chloride.

For parenteral administration it is generally desirable to further render such compositions pharmaceutically acceptable by insuring their sterility, non-immunogenicity and non-pyrogenicity. Such techniques are generally well known in the art. Moreover, for human administration, preparations should meet sterility, pyrogenicity, general safety and purity standards as required by FDA Office of Biological Standards. When the described nanoparticle composition is being introduced into cells suspended in a cell culture, it is sufficient to incubate the cells together with the nanoparticle in an appropriate growth media, for example Luria broth (LB) or a suitable cell culture medium. Although other introduction methods are possible, these introduction treatments are preferable and can be performed without regard for the entities present on the surface of a nanoparticle carrier.

To prepare the compositions described herein, the core particles and the amine functionalized polymer can be brought together simultaneously into a high shear mixing zone within a dispersion aqueous medium. The high-shear mixing zone may be provided by a propeller-like mixer, a static mixer, in-line mixers, dispersators, or other high shear mixing apparatus. The mixing efficiency of the apparatus is dependent upon the type of mixing method chosen and the precise geometry and design of the mixer. For propeller-like mixers the mixing efficiency may be approximated by the turnover rate, where the turnover rate is the stir rate (rev/sec.)

times the turnover volume (mL/rev) divided by the aqueous volume. For in-line or static mixers, multiplying the sum of the addition rates of the colloidal dispersions by the turnover volume of the mixer may approximate the mixing efficiency. In each case, the mixing efficiency has units of turnovers/sec. It is preferred that the mixing efficiency be greater than about 0.10 turnovers/sec, and preferably greater than 0.5 turnovers/sec and most preferably greater than 1 turnover/sec. Complete mixing of the two particle dispersion streams can be preferably accomplished in less than about 10 seconds; and is more preferably accomplished substantially instantaneously.

EXAMPLES

Silica colloids were purchased from Nalco Chemical Company and are Nalco 1130, mean particle diameter of 8 nm, 30% solids, pH=10.0, specific surface area=375 g/m2; Nalco 1140, mean particle diameter of 15 nm, 40% solids, pH=9.7, specific surface area=200 g/m2; Nalco 1050, mean particle diameter of 20 nm, 50% solids, pH=9.0, specific surface area=150 g/m2; Nalco 2329, mean particle diameter of 90 nm, 40% solids, pH=10.0, specific surface area=40 g/m2. All core particles have a negative Zeta potential. Polyethyleneimines were purchased from Aldrich Chemicals and are average MW=2000 g/mol, 46.5 monomers/mol polymer; average MW=10,000 g/mol, 233 monomers/mol polymer;) and average MW=60,000 g/mol, 1,395 monomers/mol polymer. The monomer molecular weight for polyethyleneimine (hereafter "PEI") was taken to be 43.0 g/mol. BVSM is bis-ethene, 1,1'-[methylenebis(sulfonyl)] as was obtained from Eastman Kodak Company. PBS (phosphate buffer system) buffer was prepared by dissolving: 137 mM NaCl (8 g), 2.7 mM KCl (0.2 g), 10 mM Na2HPO4 (1.44 g), 2 mM KH2PO4 (0.24 g) in 1.0 L distilled water.

Core-shell colloidal dispersions were prepared by the simultaneous addition of the core and the shell colloidal dispersions into a highly efficient mixing apparatus. The colloidal dispersions were introduced via calibrated peristaltic pumps at known flow rates. The mixing efficiencies and flow rates were varied to obtain stable core/shell colloidal dispersions. The details of the preparation and the characteristics of the dispersions are given below. The mixing efficiency of the apparatus is described by the turnover rate, where the turnover rate=(stir rate(rev/min)×turnover volume (ml/rev)) divided by the aqueous volume. The mixing efficiency typically was kept constant for each example and was about 25 turnovers/min, or 0.4 turnovers/sec.

Particle size determination. The volume-weighted, mean particle size diameters of the core-shell nanoparticulate carriers obtained in the following examples were measured by a dynamic light scattering method using a MICROTRAC® Ultrafine Particle Analyzer (UPA) Model 150 from Leeds & Northrop. The analysis provides percentile data that show the percentage of the volume of the particles that is smaller than the indicated size. The 50 percentile is known as the median diameter, which is referred herein as "median particle size diameter". The "volume-weighted mean particle size diameter" is calculated from the area distribution of the particle size as described in the MICROTRAC® Ultrafine Particle Analyzer (UPA) Model 150 manual. The standard deviation describes the width of the particle size distribution. The smaller the standard deviation the narrower the width of the particle size distribution.

Quantitative determination of polymer adsorption. Solution State NMR spectroscopy was used as a quantitative method to determine the amount of PEI adsorbed onto the colloidal nanoparticles. This is possible since it is known that polymers adsorbed to a particle surface show reduced mobility and are also subject to changes in magnetic susceptibility. Both of these factors lead to substantially increased linewidths of the NMR resonances resulting from polymeric material associated with particle surfaces. The dramatic increase in line-width results in an inability to observe the resonances for polymeric materials associated with the surface of the particle, and observed NMR resonances arise only from polymer free in solution. The NMR resonances of the core-shell colloids of the examples were compared to an external standard containing a known amount of dissolved (free) PEI. The relative integration of the resonances, were then utilized to determine the concentration of free PEI, and the percent PEI adsorbed to the particle was determined by difference. The use of NMR spectroscopy to quantitatively determine polymer adsorption is discussed in Colloid Polymer Sci (2002) 280: 1053-1056, Journal of Applied Polymer Science, Vol. 58, 271-278 (1995) and Journal of Colloid and Interface Science 202, 554-557 (1998).

Controlled Simultaneous Assembly:

Comparative examples have the designation "C". Examples of the invention have the designation "I".

C-1: Into a 1.0 L container containing 200 ml of distilled water which was stirred with a prop-like stirrer at a rate of about 2000 rpm was simultaneously added 200 g of a 40% (w/w) silica colloid core particle (Nalco 2329-90 nm) at a rate of 20.00 ml/min., and 27.5 g of a 10% (w/w) solution of polyethyleneimine (PEI, MW=2000 g/mol) at 3.0 ml/min., each for about 9 minutes. A 1.0 N solution of nitric acid was also simultaneously added at a rate necessary to keep the pH maintained at, or near, pH 10.0. The addition rates were controlled using calibrated peristaltic pumps. The rates were set as to keep the ratio of PEI to surface area of silica at a constant 20 umol monomer/m2. The final concentration of the resulting nanoparticle substrate ["carrier"?] was calculated to be 19% solids; the mean particle size diameter and the physical characteristics are given in Table 1.

C-2: Performed in an identical manner to that of C-1 except that the 1.0 N solution of nitric acid was simultaneously added at a rate necessary to keep the pH maintained at, or near, pH 9.0. The mean particle size diameter and the physical characteristics are given in Table 1.

C-3: Performed in an identical manner to that of C-1 except that the 1.0 N solution of nitric acid was simultaneously added at a rate necessary to keep the pH maintained at, or near, pH 8.0. The mean particle size diameter and the physical characteristics are given in Table 1.

C-4: Performed in an identical manner to that of C-1 except that the 1.0 N solution of nitric acid was simultaneously added at a rate necessary to keep the pH maintained at, or near, pH 7.0. The mean particle size diameter and the physical characteristics are given in Table 1.

I-1: Performed in an identical manner to that of C-1 except that the 1.0 N solution of nitric acid was simultaneously added at a rate necessary to keep the pH maintained at, or near, pH 6.0. The mean particle size diameter and the physical characteristics are given in Table 1 and in FIG. 1.

I-2: Performed in an identical manner to that of C-1 except that the 1.0 N solution of nitric acid was simultaneously added at a rate necessary to keep the pH maintained at, or near, pH 5.0. The mean particle size diameter and the physical characteristics are given in Table 1 and in FIG. 1.

I-3: Into a 3.0 L container containing 200 ml of distilled water which was stirred with a prop-like stirrer at a rate of about 2000 rpm was simultaneously added 1,548.0 g of a 40% (w/w) silica colloid core particle (Nalco 2329-90 nm) at a rate of 40.00 ml/min., and 213.0 g of a 10% (w/w) solution of polyethyleneimine (PEI, MW=2000 g/mol), which was adjusted to pH 5.0 with nitric acid, at a rate of 5.2 ml/in., each for 30 minutes. A 1.0 N solution of nitric acid was also simultaneously added at a rate necessary to keep the pH maintained at, or near, pH 5.0. The addition rates were controlled using calibrated peristaltic pumps. The rates were set as to keep the ratio of PEI to surface area of silica at a constant 20 umol monomer/m2. The final concentration of the resulting core-shell colloid was calculated to be 33.1% solids, and did not show visible signs of aggregation over a period of months.

TABLE 1

| Ex. or Comp. Ex. | pH | % solids | mean Particle Size diameter (nm) | standard deviation (nm) | Stable Colloid |
|---|---|---|---|---|---|
| C-1 | 10.0 | 19.1 | 1060 | 450 | No |
| C-2 | 9.0 | 18.8 | 240 | 500 | No |
| C-3 | 8.0 | 18.5 | 220 | 380 | No |
| C-4 | 7.0 | 18.4 | 220 | 380 | No |
| I-1 | 6.0 | 18.4 | 180 | 220 | Yes |
| I-2 | 5.0 | 17.8 | 130 | 70 | Yes |
| I-3 | 5.0 | 33.1 | 90 | 20 | Yes |

The data of Table 1 show the dependence of the controlled simultaneous assembly upon the pH conditions. If the pH of the assembly is substantially above about 6.0, considerable aggregation of the core-shell nanoparticulate carriers is observed and stable colloids do not result. Note that the assembly made at pH 7.0 (C-4) is not stable while the assembly at pH 6.0 (I-1) is stable. The large mean particle size diameter observed and high standard deviation are indicative of aggregation. The inventive examples, in comparison, have a smaller mean particle size diameter and smaller standard deviation and are stable colloids. The inventive examples also contain core-shell nanoparticulate carriers at a very high percentage of solids, and thus controlled simultaneous assembly represents an efficient and low-cost, synthetic route to core-shell nanoparticulate carriers.

Effect of Cross-linking: Improved Stabilization of Core-Shell Nanoparticulate Carriers Less than 50 nm.

I-4: Into a 1.0 L container containing 200 ml of distilled water which was stirred with a prop-like stirrer at a rate of about 2000 rpm was simultaneously added 200 g of a 10% (w/w) silica colloid core particle (Nalco 1140-15 nm) at a rate of 20.00 ml/min, and 19.5 g of a 10% (w/w) solution of polyethyleneimine (PEI, MW=2000 g/mol), which was adjusted to pH 5.0 with nitric acid, at a rate of 1.9 ml/min. Each component was added for 10 minutes. A 1.0 N solution of nitric acid was also simultaneously added at a rate sufficient to keep the pH maintained at, or near, pH 5.0. The addition rates were controlled using calibrated peristaltic pumps. The rates were set as to keep the ratio of PEI to surface area of silica at a constant 20 umol monomer/m². The surface area of the silica particles was taken to be approximately 200 m²/g. The mean particle size diameter and the physical characteristics measured over time are given in Table 2.

I-5: Into a 1.0 L container containing 200 ml of distilled water which was stirred with a prop-like stirrer at a rate of about 2000 rpm was simultaneously added 200 g of the nanoparticle substrate prepared in example I-4 at a rate of 20.00 ml/min, and to cross-link the PEI formed on the particles, 59.7 g of a 0.45% solution of BVSM cross-linking reagent at 6 ml/min., each for 10 minutes. The addition rates were controlled using calibrated peristaltic pumps. The rates were set as to keep the ratio of BVSM/mole PEI polymer at a constant ratio of 3:1 (mol:mol). The mean particle size diameter and the physical characteristics measured over time are given in Table 2.

TABLE 2

| Ex. or Comp. Ex. | Cross-linking | mean Particle Size diameter (nm) | standard deviation (nm) | Stability (observations) |
|---|---|---|---|---|
| I-4 | No | day 1 = 24<br>day 4 = 34 | day 1 = 8<br>day 4 = 19 | became cloudy over weeks |
| I-5 | Yes | day 1 = 20<br>day 4 = 21 | day 1 = 9<br>day 4 = 9 | stable colloid over weeks |

The data of Table 2 indicate that for core-shell nanoparticulate carriers of very small size (less than about 50 nm), the resulting colloid, while stable initially, may become unstable after weeks. The appearance of a cloudy solution is often indicative of colloid instability. In comparison, the cross-linked colloid is improved and shows stability over many weeks. The results become more evident when comparing the mean particle size diameter and the standard deviations of the particle size distributions (measured over time) of the two examples, respectively. The colloid having particles with the uncrosslinked polymer shell shows a transition toward a larger particle diameter and a larger standard deviation over time. The larger standard deviation indicates a broader particle size distribution and is consistent with the aggregation (cloudiness) observed for this sample. The colloid having particles with the crosslinked polymer shell shows no change in particle diameter and in size distribution over time, indicating that the colloid stability is improved.

Stabilization in Physiological Conditions.

Comparison Example (C-5): Into a 1.0 L container containing 200 ml of distilled water which was stirred with a prop-like stirrer at a rate of about 2000 rpm was simultaneously added 200 g of a 10% (w/w) silica colloid core particle (Nalcol™ 1140-15 nm) at a rate of 20.00 ml/min, and 17.2 g of a 10% (w/w) solution of polyethyleneimine (PEI, MW=10,000 g/mol) at a rate of 1.7 ml/min, each for 10 minutes. A 1.0 N solution of nitric acid was also simultaneously added at a rate necessary to keep the pH maintained at, or near, pH 5.0. The addition rates were controlled using calibrated peristaltic pumps. The rates were set as to keep the ratio of PEI to surface area of silica at a constant 10 umol monomer/m². The surface area of the silica particles was taken as 200 m²/g. At the end of the addition, the PEI surface modification was cross-linked through the addition of 3.75 g of a 1.8% BVSM solution added at a rate of 1.25 ml/min. The ratio of BVSM/mole PEI polymer was 2:1 (mol:mol). After cross-linking the samples were allowed to stand over several days, an aliquot of the above sample was adjusted to pH 7.4 and then solid NaCl was added to bring the salt concentration to 0.135 M. The sample immediately became cloudy and was not a stable colloid. The mean particle size diameter and the physical characteristics are given in Table 3. It is not within the scope of the invention because it is not a stable colloid under physiological conditions.

I-6: Performed in an identical manner to that of C-5 except that the rates were set as to keep the ratio of PEI to surface area of silica at a constant 20 umol monomer/m². The final concentration of core-shell nanoparticulate carriers was about 5.0% solids. The mean particle size diameter and the physical characteristics are given in Table 3. Compared to C-5, these particles have a larger amount of PEI on the surface and thus are stable under physiological conditions and therefore within the scope of the invention.

I-7: Performed in an identical manner to that of C-5 [was "C-7"] except that the rates were set as to keep the ratio of PEI to surface area of silica at a constant 30 umol monomer/m². The final concentration of core-shell nanoparticulate carriers was about 5.0% solids. The mean particle size diameter and the physical characteristics are given in Table 3.

TABLE 3

| Ex. or Comp. Ex. | ratio PEI/colloid surface area (μmol/m²) | mean Particle Size diameter (nm) @ pH 5, no salt | standard deviation (nm) @ pH 5, no salt | mean Particle Size diameter (nm) @ pH 7.4, 0.135 M NaCl | standard deviation (nm) @ pH 7.4, 0.135 M NaCl | Stable Colloid at pH 7.4, 0.135 M NaCl |
|---|---|---|---|---|---|---|
| C-5 | 10 | 26 | 14 | 2300 | 1640 | No |
| I-6 | 20 | 23 | 10 | 29 | 12 | Yes |
| I-7 | 30 | 26 | 9 | 22 | 12 | Yes |

The data of Table 3 indicate that stabilization of the inventive core-shell nanoparticulate carriers in physiological conditions shows that for these shell particles, a shelling rate of greater than 10 umol/m² silica surface is desired to produce a core-shell particle that is stable under physiological conditions.

Comparative Example (C-6): Into a 1.0 L container containing 200 ml of distilled water which was stirred with a prop-like stirrer at a rate of about 2000 rpm was simultaneously added 200 g of a 10% (w/w) silica colloid core particle (Nalco 1140-15 nm) at a rate of 20.00 ml/min, and 17.2 g of a 10% (w/w) solution of polyethyleneimine (PEI, MW=10,000 g/mol) at a rate of 3.1 ml/min, each for 10 minutes. A 1.0 N solution of nitric acid was also simultaneously added at a rate sufficient to keep the pH maintained at, or near, pH 5.0. The addition rates were controlled using calibrated peristaltic pumps. The rates were set as to keep the ratio of PEI to surface area of silica at a constant 18 umol monomer/m². The surface area of the silica particles was taken as 200 m²/g. The resulting colloid had a particle size of 24 nm, a narrow distribution width, and was colloidally stable over a period of months.

Inventive Example (I-8): The polyamine modified particles of example I-8 were adjusted to pH 7.0 with the addition of 1.0 N NaOH.

Inventive Example (I-9): The polyamine modified particles of example I-8 were adjusted to pH 9.0 with the addition of 1.0 N NaOH.

Inventive Example (C-7): The polyamine modified particles of example I-10 were adjusted back to pH 5.0 with the addition of 1.0 N HNO₃.

Inventive Example (I-10): The polyamine modified particles of example C-7 were adjusted back to pH 7.0 with the addition of 1.0 N HNO₃.

Inventive Example (I-11): The polyamine modified particles of example C-7 were crosslinked at pH 9.0 by the addition of a 1.8% BVSM solution added at a rate of 1.25 ml/min. The ratio of BVSM/mole PEI polymer was 8:1 (mol:mol).

Inventive Example (I-12): The polyamine modified particles of I-11 were adjusted to pH 7.0 with the addition of 1.0 N HNO₃.

Inventive Example (I-13): The polyamine modified particles of I-11 were adjusted to pH 7.4, NaCl was added to give a concentration of 137 mM and the sample was diluted 1:1 with PBS buffer.

The percentage of polymer adsorbed for these examples were measured as described above; and are reported in Table 4.

TABLE 4

| Ex. or Comp. Ex. | PH of measurement | % polyamine adsorbed | Remarks |
|---|---|---|---|
| C-6 | 5.0 | 33 | Only 33% adsorbed |
| I-8 | 7.0 | 56 | |
| I-9 | 9.0 | 78 | |
| C-7 | 5.0 | 40 | sample I-9 readjusted back to pH 5 |
| I-10 | 7.0 | 56 | sample C-7 readjusted back to pH 7 |
| I-11 | 9.0 | 78 | Cross-linking at pH 9.0 |
| I-12 | 7.0 | 70 | sample I-11 readjusted back to pH 7 |
| I-13 | 7.4 | 75 | sample I-11 readjusted to pH 7.4, and diluted 1:1 with PBS buffer |

The data of Table 4 indicate that the amount of adsorbed polyamine increases as the pH increases (and decreases as the pH decreases), see C-6 through I-9. However, as it was shown in Table 1, stable colloids having a narrow particle size distribution cannot be directly obtained at high pH values, but only below pH about 6.0 or 7.0. The data indicate the difficulty to directly simultaneously assemble a polyamine-modified core-shell colloid having both a high fraction of adsorbed polymer and having excellent colloidal stability. Furthermore, if the pH of the colloid is adjusted after assembly, polyamine adsorption increases but the polyamine deadsorbs if the pH is adjusted back to a lower value; see examples C-7 and I-10. Alternatively, we show an optimization of the method in which polyamine modified nanoparticles, having been assembled at low pH and subsequently cross-linked at high pH, have a high-degree of adsorbed polyamine, which remains adsorbed when adjusted back to physiological pH, and are stable colloids in physiological conditions I-12 and I-13.

Pegylation of Nanoparticles

Core-shell nanoparticulate carrier from example 5 (I-5) were added dropwise to a solution of PBS buffer containing with various amount of succinimidyl ester of methoxy PEG propionic acid (mPEG-NHS, Nektar Molecule Engineering) in a total volume of 10 mL as shown in Table 5. The absolute value of the Zeta potential is also reported.

TABLE 5

| Sample I.D. | mPEG-NHS (mg) | buffer (mL) | Nanoparticle I-5 (mL) | Zeta Potential |
|---|---|---|---|---|
| 1 | 10 | 8.5 | 1.5 | 8.1 |
| 2 | 20 | 8.5 | 1.5 | 6.8 |
| 3 | 40 | 8.5 | 1.5 | 7.1 |
| 4 | 80 | 8.5 | 1.5 | 5.6 |
| 5 | 120 | 8.5 | 1.5 | 4.8 |
| 6 | 160 | 8.5 | 1.5 | 5.4 |
| 7 | 0 | 8.5 | 1.5 | 29.3 |

Each sample was stirred at room temperature for 3 hours, then adjust pH to 4.0 with HCL. The data indicate that the core-shell nanoparticulate carrier samples 1-6 have all be successfully pegylated.

Attachment of Dyes onto Pegylated Nanoparticle Carrier

A. Weigh out 2.5 mg of fluorescein-5-isothiocynate (molecular probe) and add to 10 mL of pegylated nanoparticles (Sample ID 3 from table 4). The solution is allowed to stir for 3 hours, followed by concentrating the particle solution through YM30 (Millipore) centriprep filters in PBS buffer, repeat until filtrate solution is clear. The resulting particles solution was brought to 10 mL with PBS buffer. A comparison of the absorbance spectra of fluorescein-5-isothiocynate in PBS buffer with a fluorescein-5-isothiocynate attached to nanoparticle shows that the flourescein dye is successfully conjugated to the carrier of the invention.

B. Weigh out 1 mg of succinimidyl ester of cy7 dye (Amersham) and add to 10 mL of pegylated nanoparticles ID sample 3 from Table 4 above. The solution is allowed to stir for 3 hours, followed by concentrating the particle solution through YM30 (Millipore) centriprep filters in PBS buffer, repeat until filtrate solution is clear. The resulting particles solution was brought to 10 mL with PBS buffer. A comparison of the absorption spectra again shows conjugation of the dye with the carrier of the invention.

Attachment of Biotin onto Pegylated Nanoparticle Carrier

Weigh out 10 mg of Biotin-PEG-NHS, MW 5000 Da (Nektar Molecule Engineering) and 40 mg of succinimidyl ester of methoxy PEG propionic acid, MW5000 Da (Nektar Molecule Engineering) and dissolve both compounds in a total volume of 10 mL PBS buffer. Nanoparticle substrate of 1.5 mL from inventive example 4 (I-4) was added dropwise to the above solution. The mixture was stirred at room temperature for 3 hours. The attachment of biotin to nanoparticle substrate is verified by binding assay with fluorescein labeled avidin.

The invention claimed is:

1. A composition comprising a colloid which is stable under physiological pH and ionic strength, said colloid comprising particles having a silica core and a shell:
    a) wherein said shell comprises a cross-linked poly(ethylene)imine polymer having amine functionalities;
    b) wherein the particles have a volume-weighted mean particle size diameter of less than 200 nm,
    c) wherein greater than 50% of said polymer in the colloid is bound to the core surfaces, wherein the polymer having amine functionalities has an average molecular weight less than 100,000 g/mol, the composition has a pH of between 6 and 8; and
    d) wherein the colloid contains between 300 and 6000 μmol amine-monomer/g core particles.

2. A composition according to claim 1 wherein said volume-weighted mean particle size diameter is less than 100 nm.

3. A composition according to claim 1 wherein the standard deviation of said volume-weighted mean particle size diameter is less than the mean particle size diameter.

4. A composition according to claim 1 wherein a protective chain of polyethylene glycol is on the surface of the particle.

5. A composition according to claim 1 wherein said particles further comprise a biomedical component.

6. A composition according to claim 1 wherein said particle comprises a radiographic contrast agent.

7. A composition according to claim 1 wherein said core has a negative charge.

8. A composition according to claim 1 wherein greater than 70% of said polymer in the colloid is bound to the core surfaces.

9. A composition according to claim 1 wherein a protective chain is on the surface of said particle.

10. A composition according to claim 1 wherein said particles further comprise a biological, pharmaceutical or diagnostic component.

11. A composition according to claim 1 wherein the solids content of said colloid is between about 1 and 30% by weight.

12. A composition according to claim 1 wherein the colloid contains greater than 10 μmol amine-monomer/m$^2$ core particle surface area.

13. A composition according to claim 1 wherein the mean volume-weighted particle size diameter is less than 50 nm.

14. The composition of claim 1 wherein said composition has a pH of 7.4 and a Na salt concentration of 137 mM.

15. The composition of claim 1 wherein the colloid has a salt concentration of greater than 100 mM.

16. The composition of claim 1 wherein the composition is suitable for in-vivo applications.

* * * * *